United States Patent
Witt et al.

(10) Patent No.: US 6,341,707 B1
(45) Date of Patent: *Jan. 29, 2002

(54) PUSH-ON TAMPER RESISTANT CLOSURE

(75) Inventors: Steve Witt, Smithville; Richard Coulson, Toronto, both of (CA)

(73) Assignee: Stanpac Inc. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/686,851

(22) Filed: Oct. 12, 2000

(51) Int. Cl.[7] ................................. B65D 41/32
(52) U.S. Cl. .................. 215/256; 305/DIG. 1
(58) Field of Search ................... 215/256, 254, 215/253, 252, 250, 269, 295, 305, DIG. 1, 901, 354, 321, 320, 319, 318; 220/276, 266, 265

(56) References Cited

U.S. PATENT DOCUMENTS

| | | | |
|---|---|---|---|
| 3,300,073 A | * | 1/1967 | Benz |
| 3,338,446 A | * | 8/1967 | Faulstich |
| 3,438,529 A | * | 4/1969 | Lohrer |
| 4,166,552 A | * | 9/1979 | Faulstich |
| 4,341,318 A | * | 7/1982 | Smalley |
| 4,394,918 A | * | 7/1983 | Grussen |
| 4,401,227 A | * | 8/1983 | Pehr |
| 4,572,388 A | * | 2/1986 | Luker et al. |
| 4,676,389 A | * | 6/1987 | Bullock |
| 4,726,482 A | * | 2/1988 | Barriac |
| 4,729,488 A | * | 3/1988 | Bullock, III |
| RE32,879 E | * | 2/1989 | Wright et al. |
| 5,385,252 A | * | 1/1995 | Hidding et al. ......... 215/256 X |
| 5,472,106 A | * | 12/1995 | Nofer .......................... 215/256 |
| 5,875,908 A | * | 3/1999 | Witt et al. .................. 215/256 |
| 5,971,183 A | * | 10/1999 | Bartsch ...................... 215/256 |
| 6,112,922 A | * | 9/2000 | Nofer et al. ................ 215/252 |

FOREIGN PATENT DOCUMENTS

GB 2123390 A * 2/1984

* cited by examiner

Primary Examiner—Allan N. Shoap
Assistant Examiner—Robin A. Hylton
(74) Attorney, Agent, or Firm—Dinesh Agarwal, P.C.

(57) ABSTRACT

A one piece molded push-on tamper resistant closure suited for reusable bottles such as milk bottles comprises a cap portion and a latch ring portion connected thereto by frangible tabs. Ruptures of the tabs serves to detach the cap portion to permit its removal from the bottle, while simultaneously opening the latch ring portion to permit it to be removed laterally from the neck of the bottle. The closure includes a latch ring removal tab disposed on the latch ring portion to provide a levered force for rupturing the frangible tabs.

6 Claims, 5 Drawing Sheets

PUSH-ON TAMPER RESISTANT CLOSURE

FIELD OF INVENTION

This invention relates to improved tamper resistant push on assemblies for containers. It is particularly useful in connection with re-usable glass bottles such as milk bottles, but not necessarily limited to such use.

BACKGROUND OF INVENTION

Bottles in the nature of milk bottles were conventionally closed by means of friction fitted cardboard disks, crimped on aluminum foil caps and crimped on paper caps, none of which are tamper resistant.

Although there had been described a number of tamper resistant closures for screw bottles, as for example shown in U.S. Pat. No. 4,394,918, we did not regard it as practical to convert re-usable glass bottles such as milk bottles to screw type bottles simply to allow existing tamper resistant closures to be used, given the major capital cost involved in such conversion. Moreover, as a result of the relatively large diameter of the necks of bottles of this type and the relatively wide tolerances to which such bottles are manufactured, it was also viewed as impractical to construct tamper resistant closures on the basis of expedience such as ratcheting teeth.

With a view to providing a one piece molded tamper resistant push-on closure particularly suited for closing glass bottles which would be readily adaptable for use with existing closure machinery, we earlier devised the closure described and claimed in our U.S. Pat. No. 5,875,908. That one piece molded tamper resistant push-on closure comprises a latch ring portion and a cap portion, the latch portion including a plurality of integral, upwardly inwardly angled teeth for snap retaining the latch ring portion beneath a shoulder associated with the bottle when the closure in pushed onto the bottle, while restricting detachment of the closure therefrom. The latch ring portion and the cap portion of the closure are connected by a plurality of frangible tabs, some of which serve to retain the latch ring portion in the form of a closed annulus. The cap portion includes a pull tab disposed on a peripheral portion thereof. By exerting a moderate force on the pull tab the aforementioned frangible tabs are ruptured, opening the annulus to permit the latch ring portion to be moved transversely from engagement above the neck of the bottle.

We have since discovered that, with certain types of bottles having particular contours and dimensions of the upper rim of the bottle and the shoulder below the upper rim it is occasionally possible, with some effort, to prise a closure according to the '908 patent from the bottle, without rupturing the frangible tabs so as to provide clear visual evidence of tampering.

In order to provide a one piece molded tamper resistant push-on closure that is suited for closing glass bottles such as milk bottles, even where the rim and shoulder shape associated with the bottle opening are unusual or irregular, we found it advantageous to design more aggressive means for locking the closure in place, but without diminishing the ease of legitimate removal of the closure by tearing away the latch ring.

It is an object of the present invention to provide such an improved one piece molded tamper resistant push-on closure for glass bottles which need not be assembled on the neck of the bottle and which is readily adapted for use with existing closure machinery.

It is another object of this invention to provide such closures with frangible members that can be ruptured without the necessity of using excessive force.

It is still a further object of this invention to provide such closures that are easily removable to permit the re-use of the bottle.

SUMMARY OF THE INVENTION

In accordance with a broad aspect of the invention, a one piece molded tamper resistant push-on closure suitable for closing glass bottles comprises a latch ring portion having an upper and lower peripheral margin, an inwardly directed surface extending therebetween, and a plurality of circumferentially spaced slots therethrough. A plurality of resiliently deformable teeth depends from the latch ring in an upwardly inwardly direction relative to the interior surface thereof, each said tooth presenting on its surface an integral bead of a shape and disposition adapted to project through a corresponding one of said slots through the latch ring portion as the latch ring is engaged onto the neck of a bottle.

The closure of the invention further comprises a cap portion having a lower peripheral margin and an inwardly directed surface extending upwardly from the lower peripheral margin thereof. A plurality of frangible tabs connect between the latch ring portion and the cap portion. A manually engagable tab integral with the latch ring portion projects outwardly from the latch ring portion. Application of a suitable manual force to the tab with progressively rupture the frangible tabs and permit the cap to be removed from the bottle to which the closure has been applied.

In this arrangement, force exerted on the projecting tab is applied at one radial point rather than about the whole of the periphery of the cap and results in the more or less serial rupture of the frangible tabs, rather than their being ruptured simultaneously. Accordingly, it is found that the force necessary to disengage the cap from the latch ring using the manually engagable tab is well within the capability of the average person, while the cumulative force is sufficiently high as to reduce the likelihood of an inadvertent detachment.

In a preferred embodiment, the manually engagable tab is in the form of a part-parabolic convex projection having a rearward truncated wall surface acutely angled to a diameter of the closure therethrough for comfortable accommodation of the tip a user's thumb or finger, affording the grip and leverage needed to break the first frangible tabs and so permit tearing away of the latch ring portion.

Generally speaking, the upper end of the cap portion will be in the form of a flat dome, and suitably a stopper will depend downwardly from the dome to provide a liquid tight seal with the interior surface of the bottle. Desirably, the stopper will have a tubular cross-section so as to be resiliently deformable and accommodate normal variations found in glass milk bottles, for example. Also preferably, the stopper will have a maximum external diameter intermediate the axial ends thereof so as to facilitate the initial engagement of the stopper in the neck of the bottle and to localize sealing forces.

Also preferably, the latch ring is in the form of an open annulus which permits is ready removal from the neck of a bottle once the frangible tabs have been ruptured.

The foregoing objects and aspects of the invention, together with other objects, aspects and advantages thereof will be more apparent from a consideration of the following description of the preferred embodiment thereof taken in conjunction with the drawings annexed hereto.

DESCRIPTION OF THE PREFERRED EMBODIMENT

Figure 1:
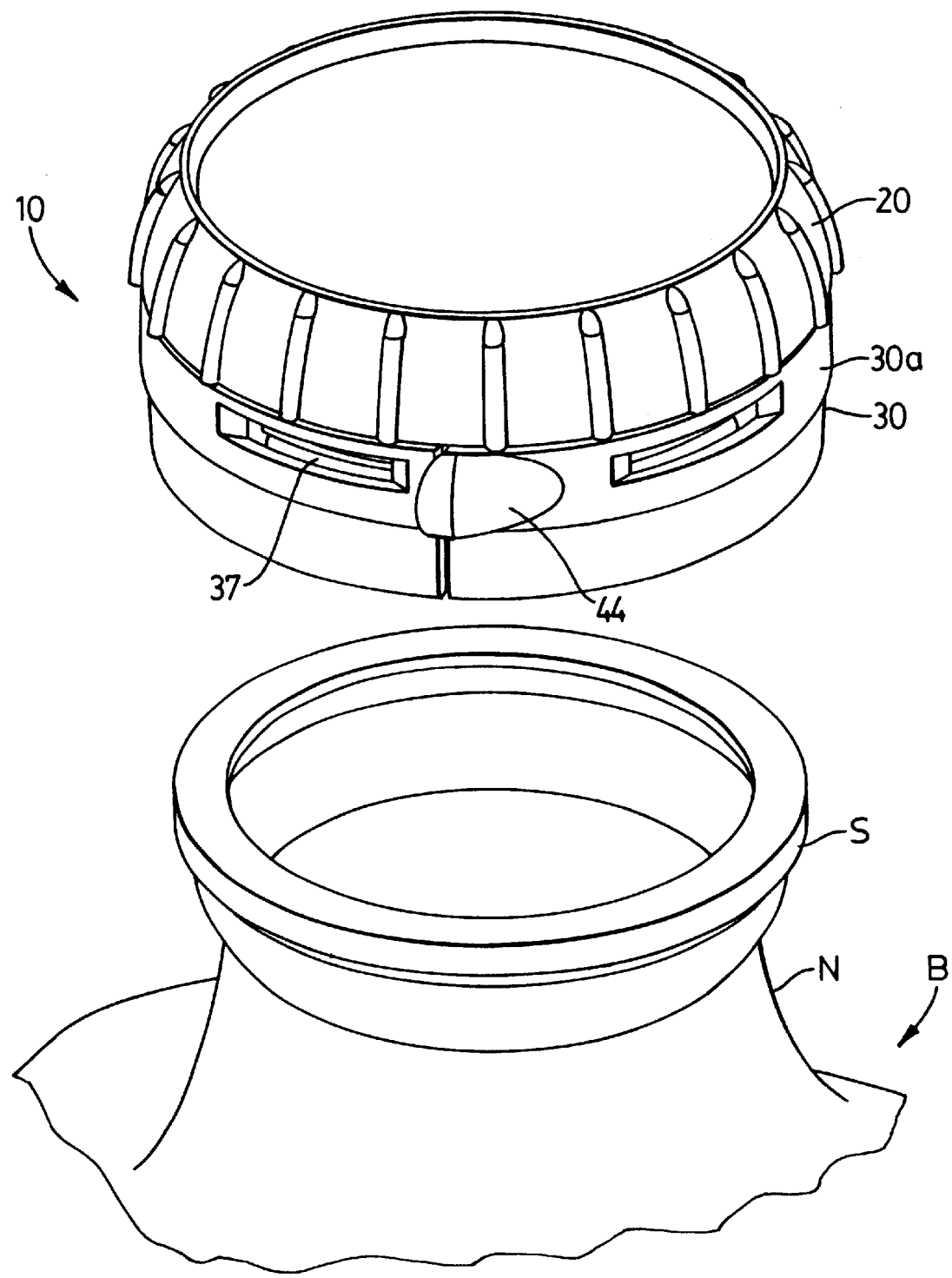
FIG. 1 shows a bottle cap in accordance with the invention in perspective view, together with a portion of a milk bottle.
Figure 2:
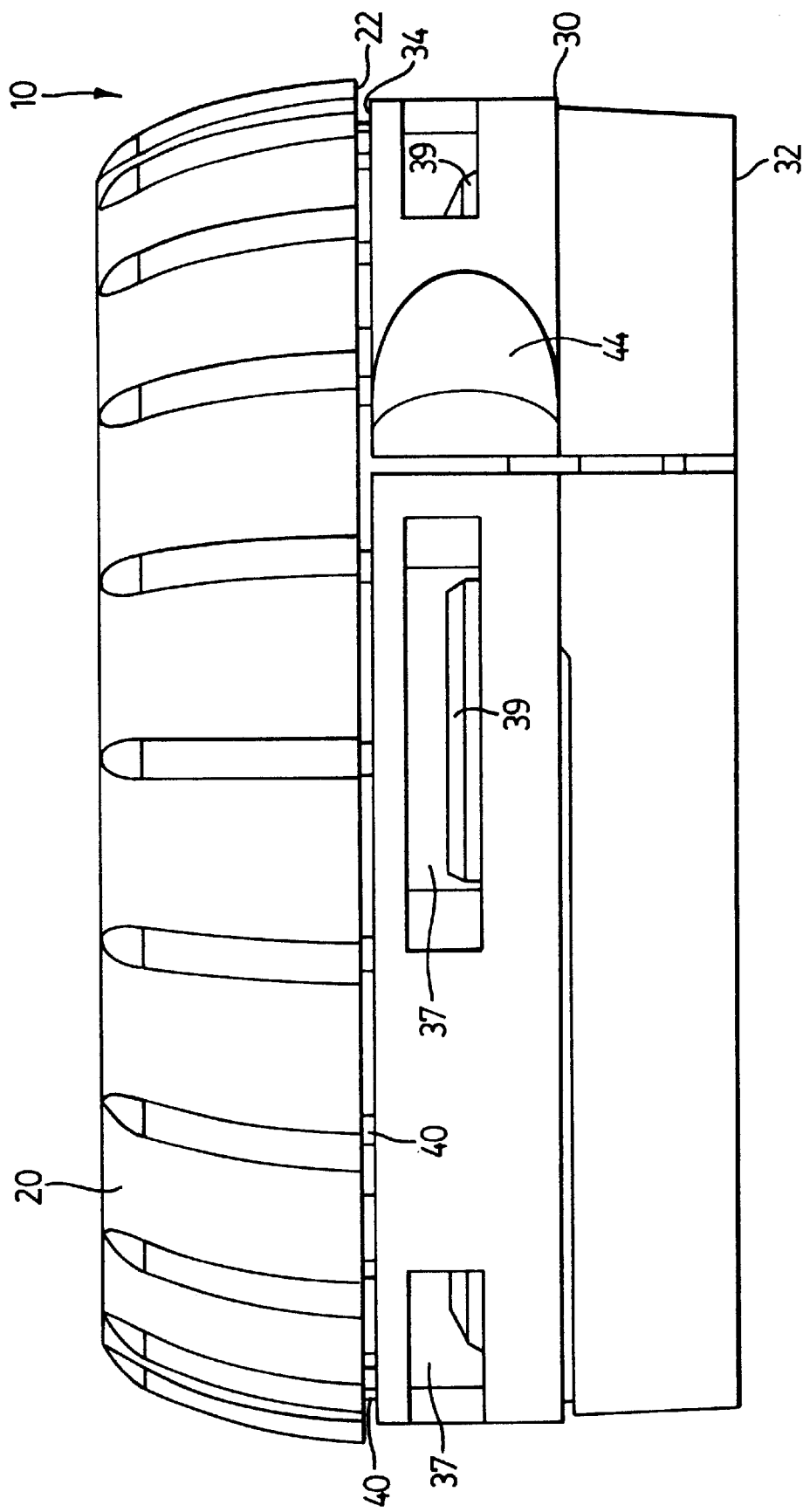
FIG. 2 shows the bottle cap of FIG. 1 in elevation, facing toward the latch ring removal tab.
Figure 3:
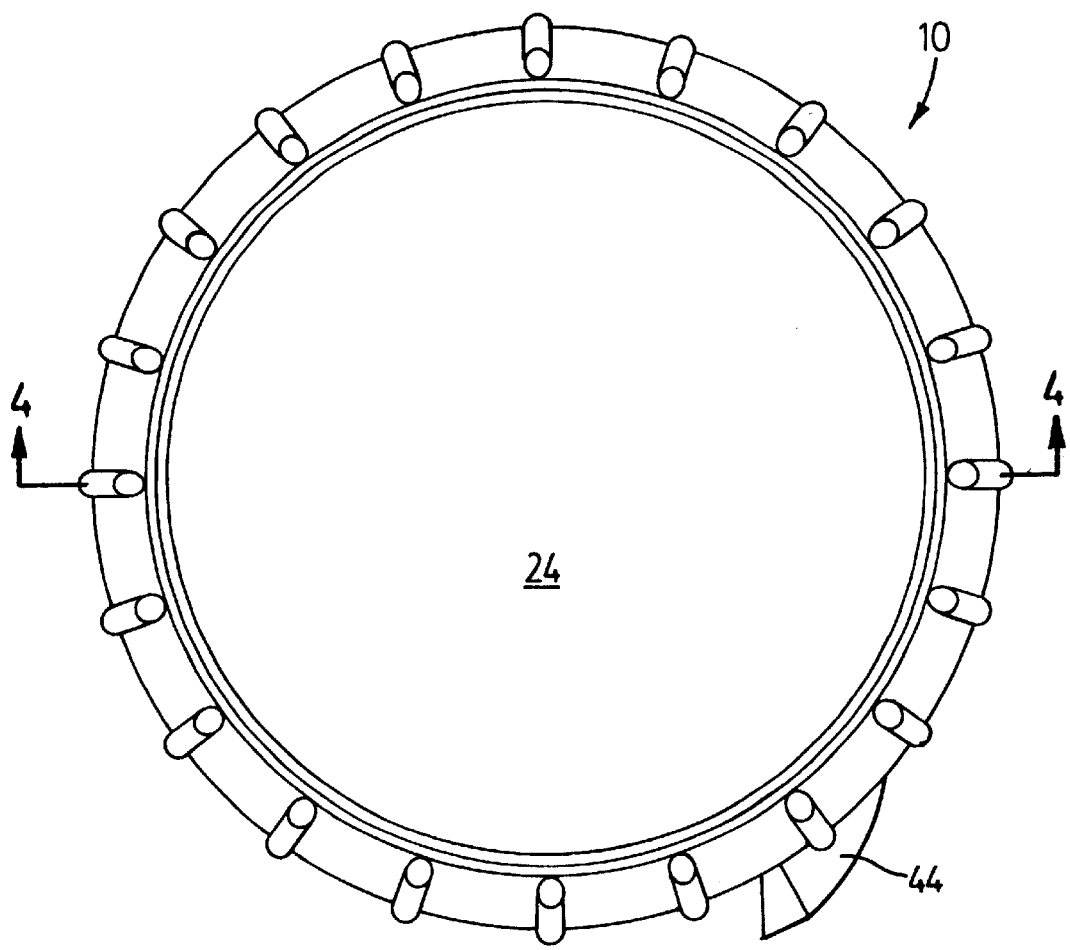
FIG. 3 is a plan view from above of the bottle cap of FIG. 1.
Figure 4:
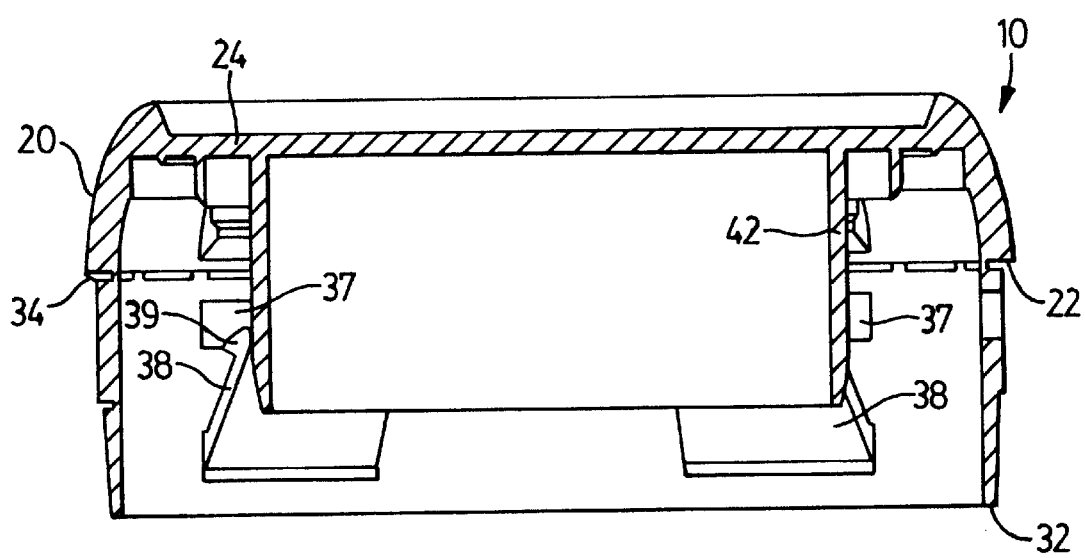
FIG. 4 is a section along line A—A of FIG. 3 in the direction of the arrows.
Figure 5:
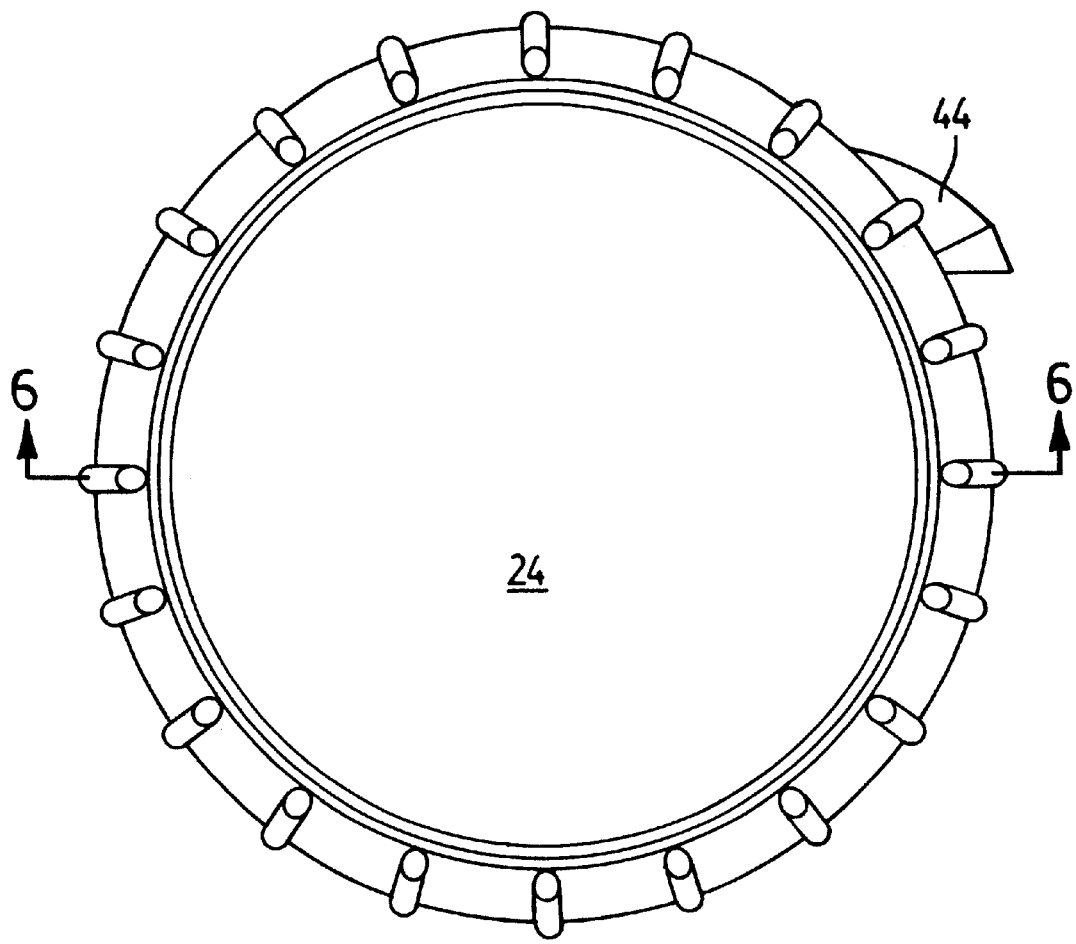
FIG. 5 is a further plan view from above of the bottle cap of FIG. 1, but rotationally displaced from the view of FIG. 3 to put the region of the closure including the latch ring removal tab in the upper half the drawing.
Figure 6:
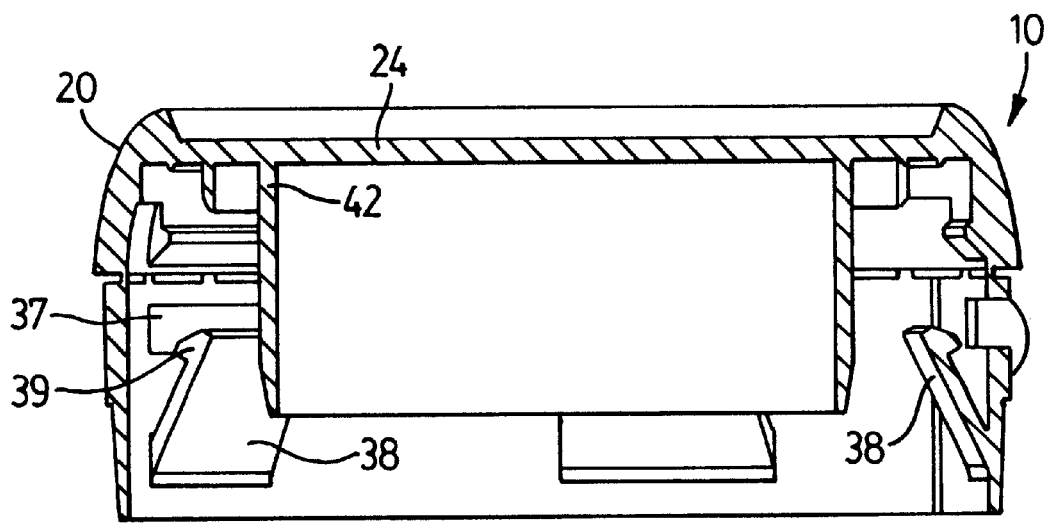
FIG. 6 is a section along line B—B of FIG. 5, including that portion of the closure including the latch ring removal tab.
Figure 7:
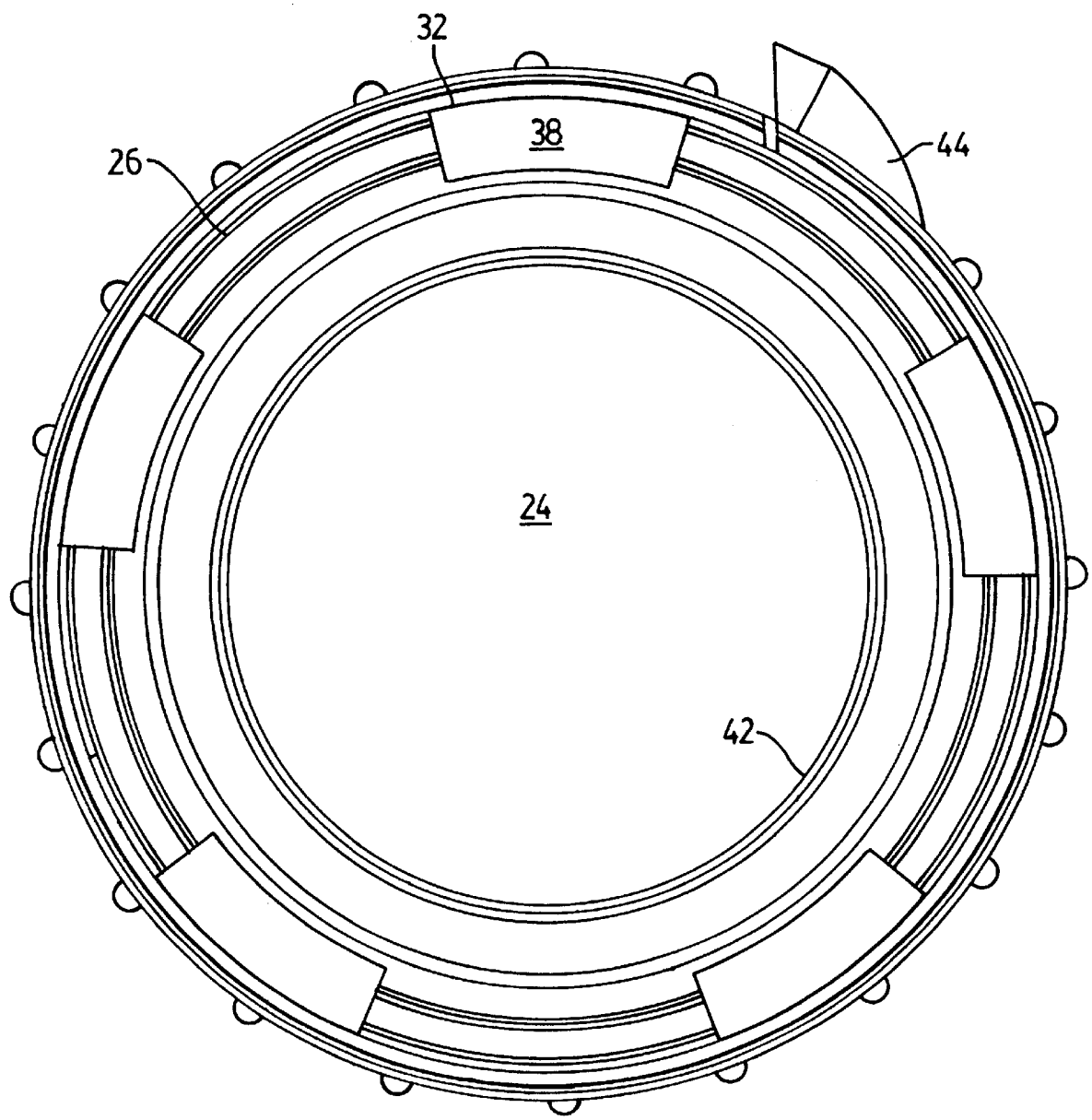
FIG. 7 is a plan view from below from the bottle cap of FIG. 1.

Referring to the drawings in detail, a bottle closure in accordance with the invention is denoted generally by the numeral 10. Bottle closure 10 comprises a cap portion 20 defined in part by a lower peripheral margin 22, a cover 24 and inwardly directed surface 26 extending therebetween.

Closure 10 further comprises a latch ring 30 defined in part by a lower peripheral margin 32, an upper peripheral margin 34, and inwardly directed surface 36 therebetween. A plurality of elongate rectangular slots 37 through latch ring 30 are regularly disposed around an upper portion 30a of the latch ring. A corresponding plurality of resiliently deformable teeth 38 depend upwardly inwardly from the lower peripheral margin 32 of the latch ring. Each of these teeth includes an outwardly directed integral locking bead 39, the slots 37 and beads 39 being dimensioned such that the deformation of teeth 38 when the closure 10 is push fitted onto a bottle neck results in the fitting of the beads through slots, therebylocking the latch ring against vertical displacement, as will be further described.

A plurality of frangible tabs 40 interconnect the upper peripheral margin 34 of the latch ring 30 to the lower peripheral margin 22 of the cap portion 20, to integrate the two portions. Latch ring portion 30 is in the form of an open annulus.

The cover 24 of cap portion 20 is generally in the form of a flat dome, and a stopper 42 is downwardly dependent therefrom. Stopper 42 has a tubular cross-section with a portion 46 of maximum diameter intermediate the axial ends of the stopper.

The structure of closure 10 as described is such that the closure is moldable in one piece, with teeth 38 angled inwardly upwardly as illustrated, which avoids the necessity of a separate operation to re-form the teeth following the initial molding step. This unitary operation permits the diameter of the inwardly directed surface 34 of latch ring portion 30 to be closely controlled so as to provide a close friction fit for the latch ring portion over the neck of a bottle with the greatest design diameter, while permitting its use with bottles with smaller necks within the normally anticipated tolerance range.

In use, closure 10 is applied to bottle B using standard bottle capping machinery by merely pushing the cover about the opening into the bottle. This will cause teeth 38 to be deformed so that their associated locking beads 39 project through corresponding slots 37 and engage lockingly with the walls thereof.

Unlike the bottle cap described and claimed in our U.S. Pat. No. 5,875,908, the locking of the intact closure 10 is not only effected by the latching of locking teeth of the latch ring under the shoulders of a bottle rim (which can depart from size tolerance), but also by the locking of the teeth 38 in place on the tamper-evident band itself, i.e., on the latch ring portion 30, by the engagement of locking beads 39 with slots 37. In the result, it is practically impossible to remove closure 10 manually without destroying the integrity of the latch ring portion and producing obvious signs of tampering. The fitting of closure 10 in this manner will cause stopper 42 to enter into the neck N of bottle B and be compressed to form a tight liquid seal.

To remove closure 10 from the bottle initially, a levering force is applied by the thumb or fingers to latch ring removal tab 44 to rupture frangible tabs 40. Tab 44 may advantageously be molded integrally to the upper portion of the latch ring 30a, in the form of a convex paraboloidal dome having an oblique rear wall 44a to receive finger or thumbnail pressure. The rupturing force applied to tab 44 will serve to progressively break the frangible tabs, thereby permitting cap portion 20 to be removed from the bottle. This, in turn, permits the latch ring portion to be removed from the neck of the bottle in a transverse manner under a negligible force, and this removal is likely to arise at the time when a user first removes the cap portion 20 from bottle B.

Although a particular embodiment of the invention has been illustrated and described herein, one of ordinary skill in the art will appreciate that changes or additions may be made to the design of the closure without departing from the spirit and scope of the invention, which is defined in the claims attached hereto.

We claim:

1. A one piece molded tamper resistant push-on closure suitable for closing a glass bottle, comprising:

a latch ring portion having an upper and lower peripheral margin, an inwardly directed surface extending therebetween, and a plurality of circumferentially spaced slots through said inwardly directed surface, a plurality of resiliently deformable teeth depending from said latch ring portion in an upwardly inwardly direction relative to said inwardly directed surface, each said tooth including an integral bead adapted to project through one of said slots of the latch ring portion as said latch ring is engaged onto the neck of a bottle;

a cap portion having a lower peripheral margin and an inwardly directed surface extending from said lower margin thereof;

a plurality of frangible tabs interconnecting said cap portion and said latch ring portion; and a manually engagable tab projecting from said latch ring portion for the application thereto of a suitable manual force to progressively rupture said frangible tabs and permit said cap to be removed from said bottle when said closure is applied thereto.

2. A closure as defined in claim 1, wherein said cap portion includes a flat dome and a stopper downwardly depending therefrom for engaging within the neck of a bottle to provide a liquid tight seal therewith.

3. A closure as defined in claim 2, wherein said stopper has a tubular cross section.

4. A closure as defined in claim 3, wherein said tubular cross section has a maximum diametric dimension intermediate the axial ends of said stopper.

5. A closure as defined in claim 1, wherein said frangible tabs interconnect upper peripheral marginal portion of said latch ring portion and lower peripheral marginal portion of said cap portion.

6. A closure as defined in claim 1, wherein said latch ring portion is in the form of an annulus which opens when said frangible tabs are ruptured to detach said cap portion from said latch ring portion, thereby permitting said latch ring portion to be removed from the neck of a bottle in a transverse direction.

* * * * *